US011995635B2

(12) United States Patent
Venkat et al.

(10) Patent No.: US 11,995,635 B2
(45) Date of Patent: *May 28, 2024

(54) METHODS AND SYSTEMS FOR E-COMMERCE PAYMENT TRANSACTIONS

(71) Applicant: VISA INTERNATIONAL SERVICE ASSOCIATION, San Francisco, CA (US)

(72) Inventors: Gayathri Venkat, Austin, TX (US); Arvind Santhanaraman, San Francisco, CA (US); Sanjeev Sharma, Foster City, CA (US); Prasanth Yeddula, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/847,879

(22) Filed: Jun. 23, 2022

(65) Prior Publication Data

US 2022/0335408 A1 Oct. 20, 2022

Related U.S. Application Data

(63) Continuation of application No. 16/290,093, filed on Mar. 1, 2019, now Pat. No. 11,443,296.

(51) Int. Cl.
*G06Q 20/32* (2012.01)
*G06Q 20/24* (2012.01)
(Continued)

(52) U.S. Cl.
CPC ......... *G06Q 20/3274* (2013.01); *G06Q 20/40* (2013.01); *G06Q 20/24* (2013.01); *G06Q 20/26* (2013.01)

(58) Field of Classification Search
CPC .... G06Q 20/3274; G06Q 20/40; G06Q 20/26; G06Q 20/24; G06Q 20/3276
See application file for complete search history.

(56) References Cited

U.S. PATENT DOCUMENTS

2014/0120886 A1* 5/2014 Xu ..................... G06Q 30/0641
   455/414.1
2015/0248664 A1* 9/2015 Makhdumi ........ G06Q 20/3274
   235/380

(Continued)

OTHER PUBLICATIONS

A. Surekha, P. M. Rubesh Anand and I. Indu, "E-payment transactions using encrypted QR codes", Int. J. Appl. Eng. Res, vol. 10, No. 77, pp. 460-463, 2015 (Year: 2015).*

(Continued)

*Primary Examiner* — Bennett M Sigmond
*Assistant Examiner* — Bolko M Hamerski
(74) *Attorney, Agent, or Firm* — K&L Gates LLP

(57) ABSTRACT

A merchant website includes a QR code button to initiate a payment transaction. The QR code button is selected by a consumer at checkout. If selected, a QR code is generated on a second computing device. The QR code is displayed on a second computing device and contains embedded data such as a token for a PAN stored in a memory of the second computing device and two cryptograms. A webcam in communication with the first computing device is used to scan the QR code. The data embedded in the QR code is passed from the second computing device to the merchant website via the first computing device and used to complete the payment transaction.

20 Claims, 8 Drawing Sheets

(51) Int. Cl.
  *G06Q 20/26* (2012.01)
  *G06Q 20/40* (2012.01)

(56) References Cited

U.S. PATENT DOCUMENTS

| | | | |
|---|---|---|---|
| 2016/0212613 A1* | 7/2016 | Huang | H04W 4/70 |
| 2018/0130051 A1* | 5/2018 | Matthews | G06V 10/17 |
| 2018/0268399 A1* | 9/2018 | Spector | G06Q 20/202 |
| 2019/0066089 A1* | 2/2019 | Miryala | G06Q 20/367 |
| 2020/0279245 A1 | 9/2020 | Venkat | |

OTHER PUBLICATIONS

Office Action (Final Rejection) dated Apr. 5, 2022 for U.S. Appl. No. 16/290,093 (pp. 1-9).
Office Action (Notice of Allowance and Fees Due (PTOL-85)) dated May 6, 2022 for U.S. Appl. No. 16/290,093 (pages (1-13).
Office Action dated Aug. 25, 2021 for U.S. Appl. No. 16/290,093 (pp. 1-20).

\* cited by examiner

METHODS AND SYSTEMS FOR E-COMMERCE PAYMENT TRANSACTIONS

CROSS-REFERENCE TO RELATED APPLICATIONS

This application is a continuation application of U.S. application Ser. No. 16/290,093 entitled "METHODS AND SYSTEMS FOR E-COMMERCE PAYMENT TRANSACTIONS", filed on Mar. 1, 2019, the entire contents of which are hereby incorporated by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce sales make up approximately 10% of all retail sales in the U.S. and this number continues to grow in the U.S. as well as abroad. The convenience of e-commerce or online shopping makes it a popular choice for busy individuals and families. However, the convenience of e-commerce does not come without risk. E-commerce transactions rely on "card-not-present" or CNP payment methods, in which consumers are required to enter their financial account or transaction card credentials such as name, primary account number (PAN), expiration date, personal identification number (PIN), card verification value (CVV), and/or billing address in order to complete a purchase. Merchant systems receive this information and may store it, which makes them vulnerable to attacks by hackers. In addition, merchants do not have a good way of verifying that the person entering the data is an authorized user of the transaction card or financial account.

In addition, to the risks associated with the online shopping experience, consumers who utilize mobile payment applications or digital wallets do not have an easy and efficient way to use these technologies to quickly make an online purchase as they do when they are in-store. For example, a retail store may provide the consumer with a quick response (QR) code for the purchase total when the consumer is checking out in-store, which can be scanned by the consumer's mobile phone to complete the purchase. QR codes have become popular due to their quick readability and greater storage capacity compared to standard bar codes. Alternatively, a merchant may provide near field communication (NFC) readers at in-store payment terminals, which a consumer can use to tap his or her NFC enabled phone on to complete the transaction. These options, however, are not currently available to consumers when making online purchases.

Thus, there exists a need to incorporate QR code and NFC technologies into the online shopping experience to may online shopping more secure and efficient.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a merchant's website may be displayed on a first computing device. The merchant website may include a QR code button to initiate a payment transaction. The QR code button may be selected by a consumer at checkout. If selected, a QR code is generated on a second computing device. The QR code may contain embedded data such as a token for a PAN stored in a memory of the second computing device and two cryptograms. The QR code may be displayed on the second computing device. A webcam in communication with the first computing device may be used to scan the QR code. The data embedded in the QR code may be passed from the second computing device to the merchant website via the first computing device and used to complete the payment transaction.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

Figure 1:
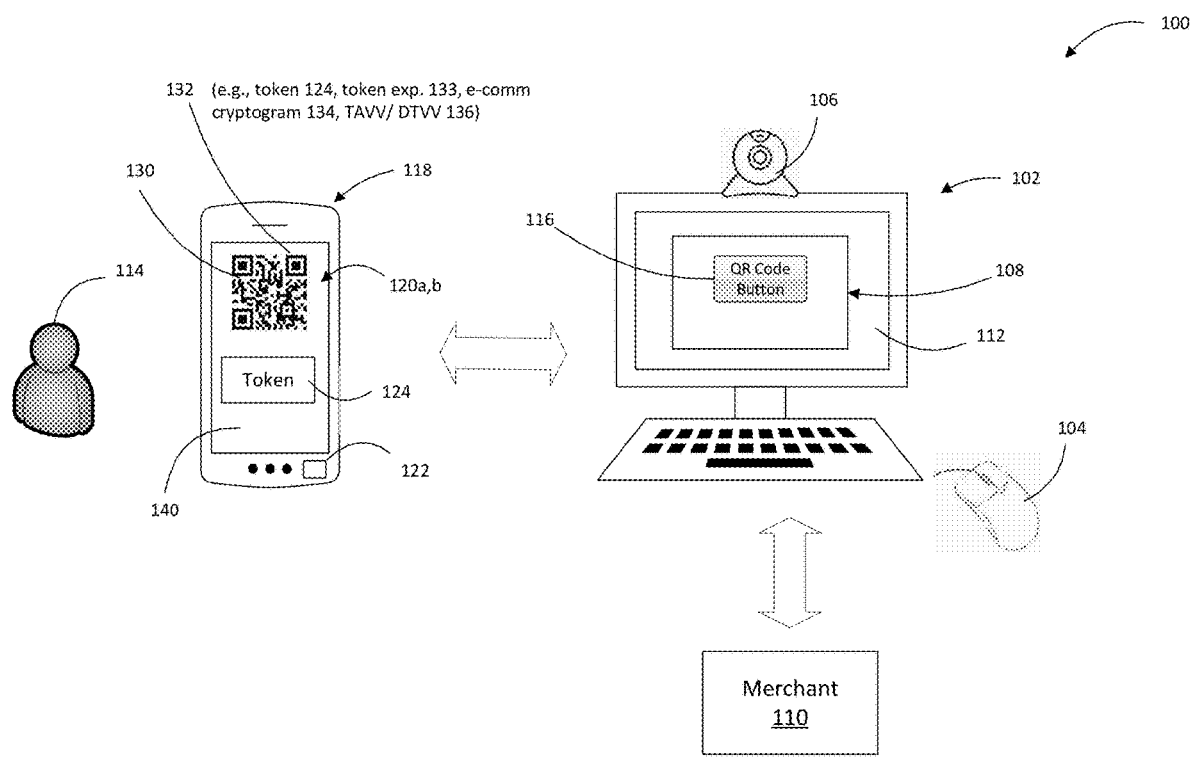
FIG. 1 illustrates a diagram of system components for an e-commerce payment transaction using a QR code in accordance with the present disclosure.

FIG. 1 generally illustrates an embodiment of a system 100 for an e-commerce payment transaction using QR codes. The system 100 may include a first computing device 102, which may be a laptop computer, desktop computer, tablet, mobile phone or the like. The first computing device may have or be in communication with a mouse 104 and a webcam 106. The first computing device 102 may host a website 108 of a merchant 110 that is in communication with the first computing device 102. The first computing device 102 may display the website 108 on a display 112 of the first computing device 102. The website 108 may be used by a consumer 114 to purchase goods or services from the merchant 110. The website 108 may include a QR code button 116. When a consumer is finished selecting the items and/or services offered by the merchant 110 that the consumer 114 wishes to purchase and is ready to check out, the consumer 114 may select the QR code button 116 rather than proceeding with the normal checkout options of logging into a merchant payment account or third party account or entering payment credentials into a payment window of the website 108. The QR code button 116 may be selected by clicking on the QR code button 116 with the mouse 104 or by a touch or other interaction with the display 112.

The system 100 may also include a second computing device 118 that may be in communication with the first computing device 102. The second computing device 118 may be a mobile phone, tablet, a laptop computer, or other mobile computing device. The second computing device 118 may have a payment app 120a or digital wallet platform 120b downloaded and saved in a memory 122 of the second computing device 118. The payment app 120a or the digital wallet platform 120b may be for example, Apple Pay™, Google Wallet™, Samsung Pay™, Walmart Pay™, among others.

Figure 3:
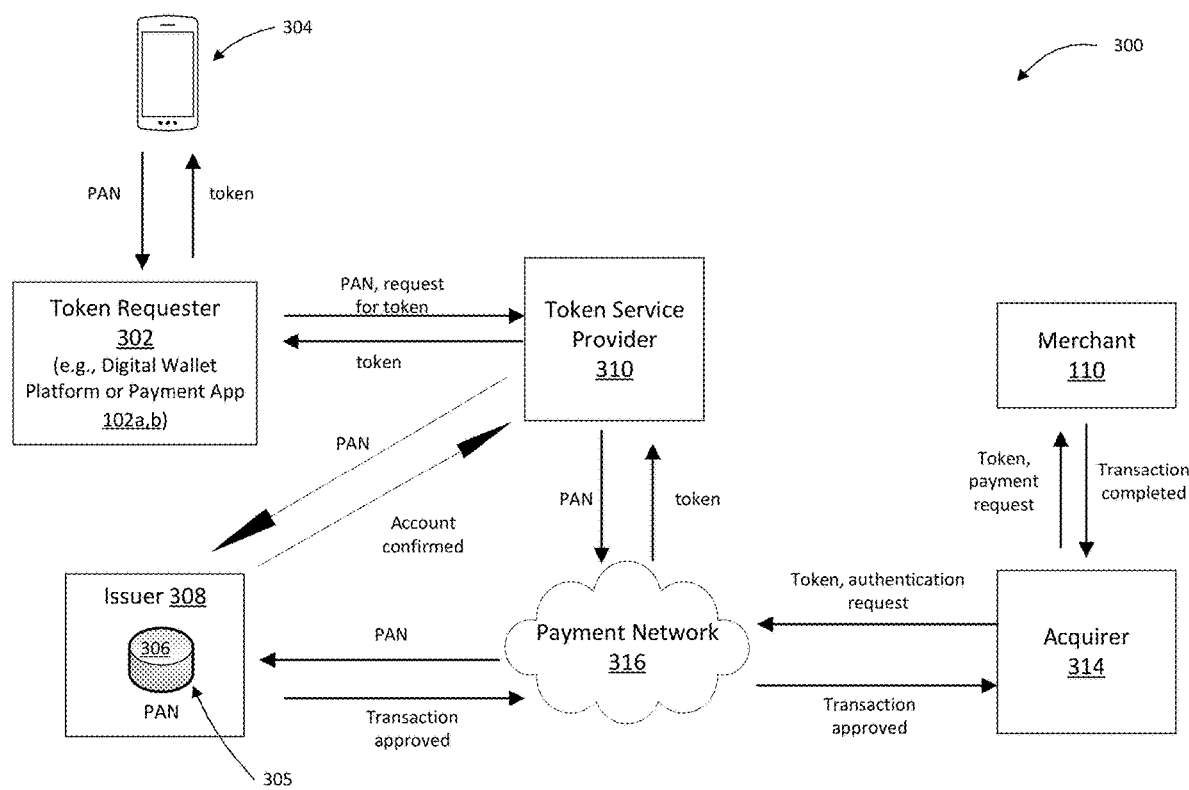
FIG. 3 is a block diagram illustrating system components for token provisioning and payment via tokens.

The payment app 120a or the digital wallet platform 120b may have a token 124 that is stored in the memory 122. The token 124 may be a substitute identifier for a primary account number (PAN) 306 issued by an issuer 308, as shown in FIG. 3, for a transaction card associated with a financial account 305 such as a credit card, debit card, gift card, e-gift card, loyalty card, brokerage account, retirement account, etc. For example, tokens may be a series of numeric or alphanumeric characters. Tokens provide additional security to both consumers and merchants in the event of a security breach because the token has limited value outside the payment app 120a or digital wallet platform 120b.

Although embodiments herein reference a single token, PAN, and issuer, any number of tokens corresponding to any number of PANs issued by one or more issuers may be stored in the memory 122 and accessible via the payment app 120a or the digital wallet platform 120b.

Tokens and provisioning at a high level replace a PAN with a separate code which may be only decoded by the intended receiver. In general, a system 300 for provisioning tokens is provided in FIG. 3. To provision a PAN associated with a financial account into a payment app or digital wall platform, a consumer may contact a token requester 302 via a computing device 304 such as second computing device 118. The token requester 302 may be the digital payment app 120a or the digital wallet platform 120b or an intermediary entity. The consumer provides credentials for a financial account 305, such as the PAN 306 issued by issuer 308, to the token requester 302, which in turn sends the PAN 306 to a token service provider 310. A token service provider may provide tokens and token management for a number of token requesters, issuers and other entities The token service provider 310 generates a token and correlates it to the PAN 306 then passes the token back to the token requestor. If the token requestor is the payment app 120a or the digital wallet platform 120b, then the token is received and stored in a memory of the computing device 304 (e.g., memory 122). Otherwise, the intermediary token requestor passes the token to the payment app 120a or the digital wallet platform 120b for storage.

To make a transaction using the token under traditional methods, a consumer presents the token to a merchant, such as merchant 110, via his or her payment app or digital wallet. For example, the consumer may present a NFC-enabled mobile phone to a NFC reader in-store at a merchant point of sale (POS) terminal. The consumer may tap or hover the mobile phone over the NFC reader to initiate the payment transaction. Alternatively, the consumer may use a his or her mobile phone to generate and display a QR code with the token embedded therein and present the QR code in-store to a QR code scanner at the merchant POS terminal. For online transactions, a consumer may use the token by logging-in his or her digital wallet account for a digital wallet platform during checkout on the merchant website. The present disclosure combines the ease and security of the in-store checkout process with the convenience of online shopping by extending QR code and NFC technology to the e-commerce ecosystem as described herein.

Once the token is received by the merchant 110, a request to pay including, for example, the token and payment amount is sent to a processing entity such as an acquirer 314 for payment processing and authorization. The acquirer 314 may send an authorization request, including the token and payment amount, to a payment network 316. The payment network 316 may send the token to the token service provider 310, which looks up the PAN 306 associated with the token. Alternatively, the payment network 316 may serve as a token service provider and match the token to the PAN. Once the PAN 306 is obtained, the PAN 306 along with the payment amount for the goods/services being purchased are sent to the issuer 308 for approval. The issuer 308 determines if the financial account associated with the PAN 306 has enough funds for the purchase and then sends a decline or approval message to the payment network 316, which in turn sends the message to the acquirer 314. Upon receipt of a transaction approval message, the acquirer 314 facilitates the transfer of funds from the consumer's financial account 305 to the merchant 110 and sends a transaction complete message to the merchant 110, which may be displayed to the consumer.

Returning to FIG. 1, the payment app or digital wallet platform may be capable of generating a QR code 130 in response to the consumer 114 selecting the QR code button 116 when the consumer 114 is ready to checkout. QR codes are a type of 2D barcode that consist, for example, of black modules arranged in a square pattern on a white background. Data may be encoded or embedded in the QR code. Imaging devices such as webcam 106 may read the QR code and extract the data from patterns present in both horizontal and vertical components of the code. The QR code may be displayed on a display screen 140 of the second computing device 118. The QR code 130 may include embedded data 132 such as the token 124, an expiration date of the token 133, a first cryptogram 134, a second cryptogram 136, and other payment credentials such as billing address. Each time a payment transaction is requested through the QR code button 116, a unique QR code 130 is generated.

The first and second cryptograms 134, 136 may be dynamic in that they change each time a QR code is generated and may use EMV-based cryptography to secure the transaction. EMV, which is an acronym for Europay, MasterCard and Visa, is a payment standard that facilitates the worldwide interoperability and acceptance of secure payment transactions. The first cryptograms 134 may be an ecommerce cryptogram. The ecommerce cryptogram may be used for a process called Online Card Authentication. This cryptogram may be generated by a transaction card for transactions requiring online authorization. The first cryptogram may also be generated by a token service provider such as Visa Token Service. The second cryptogram 136 may be a Transaction Authentication Verification Value (TAVV) cryptogram or a Dynamic Token Verification Value (DTVV) cryptogram. TAVV and DTVV cryptograms may ensure that the payment request originates from the original token requestor (i.e., consumer 114) and the transaction is unique (e.g., that the same QR Code is not being used for a different payment amount). The second cryptogram may also be generated by a transaction card or a token service provider.

Figure 1A:
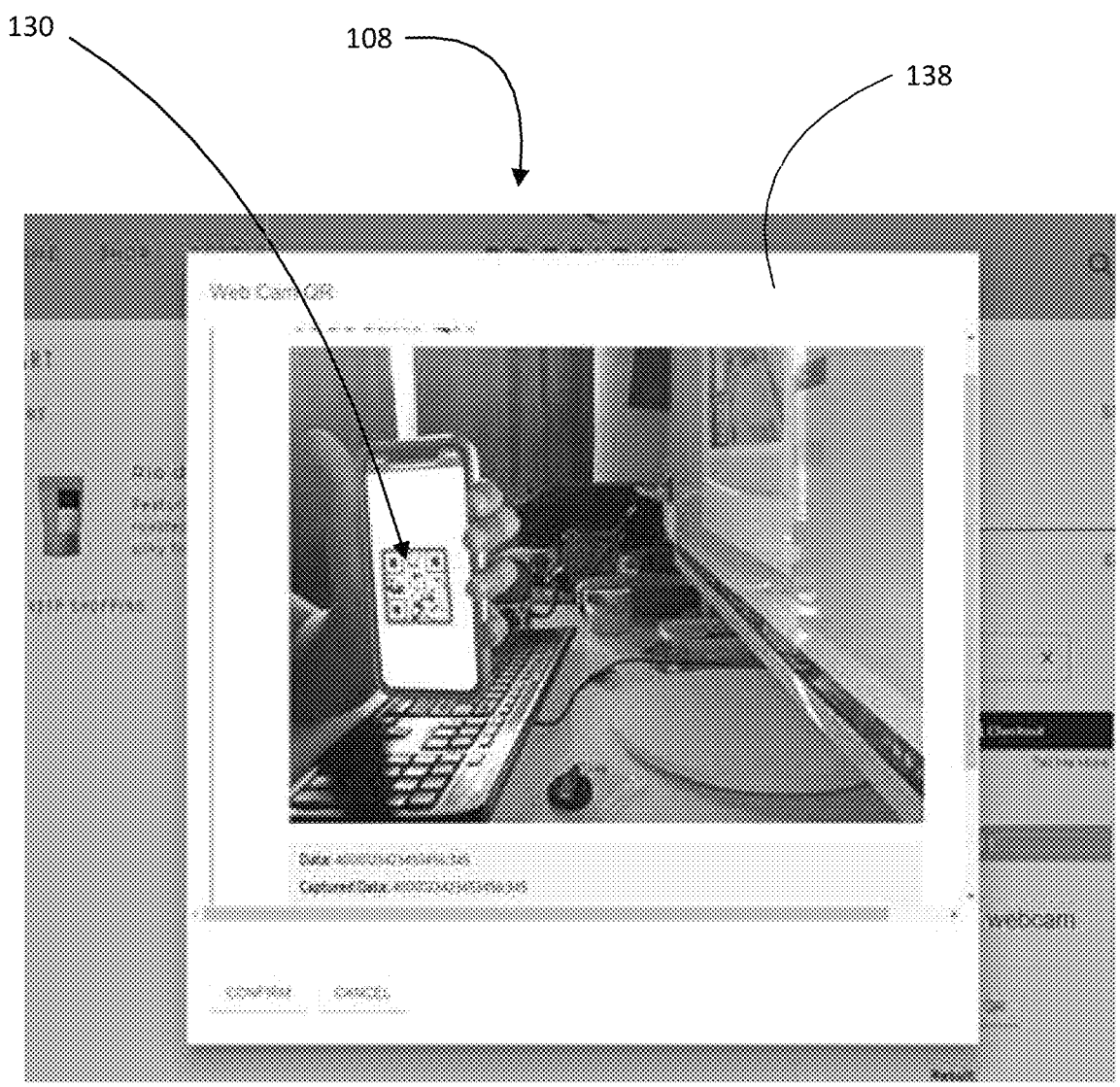
FIG. 1A illustrates an exemplary pop-up window used to facilitate an e-commerce payment transaction using a QR code.

Upon selection of the QR code button 116, the webcam 106 may become activated and a pop-up window 138 may be launched from the website 108 and presented on the display 112. An example pop-up window is shown in FIG. 1A. The consumer 114 may use the webcam 106 to scan the QR code 130 on the second computing device 118. The pop-up window 138 serves as a visual aid to facilitate the scanning of the QR code 130. When the QR code 130 has been successfully scanned, a notification or other indication may be displayed on the first computing device indicating that the QR code has been successfully scanned. Through the scanning process, the merchant 110 obtains the embedded data 132. Once the embedded data 132 is obtained it is sent to the acquirer 314 for authentication along with the transaction payment amount for approval and processing. Once the data is authenticated and the payment amount approved, the purchase transaction is completed.

Figure 2:
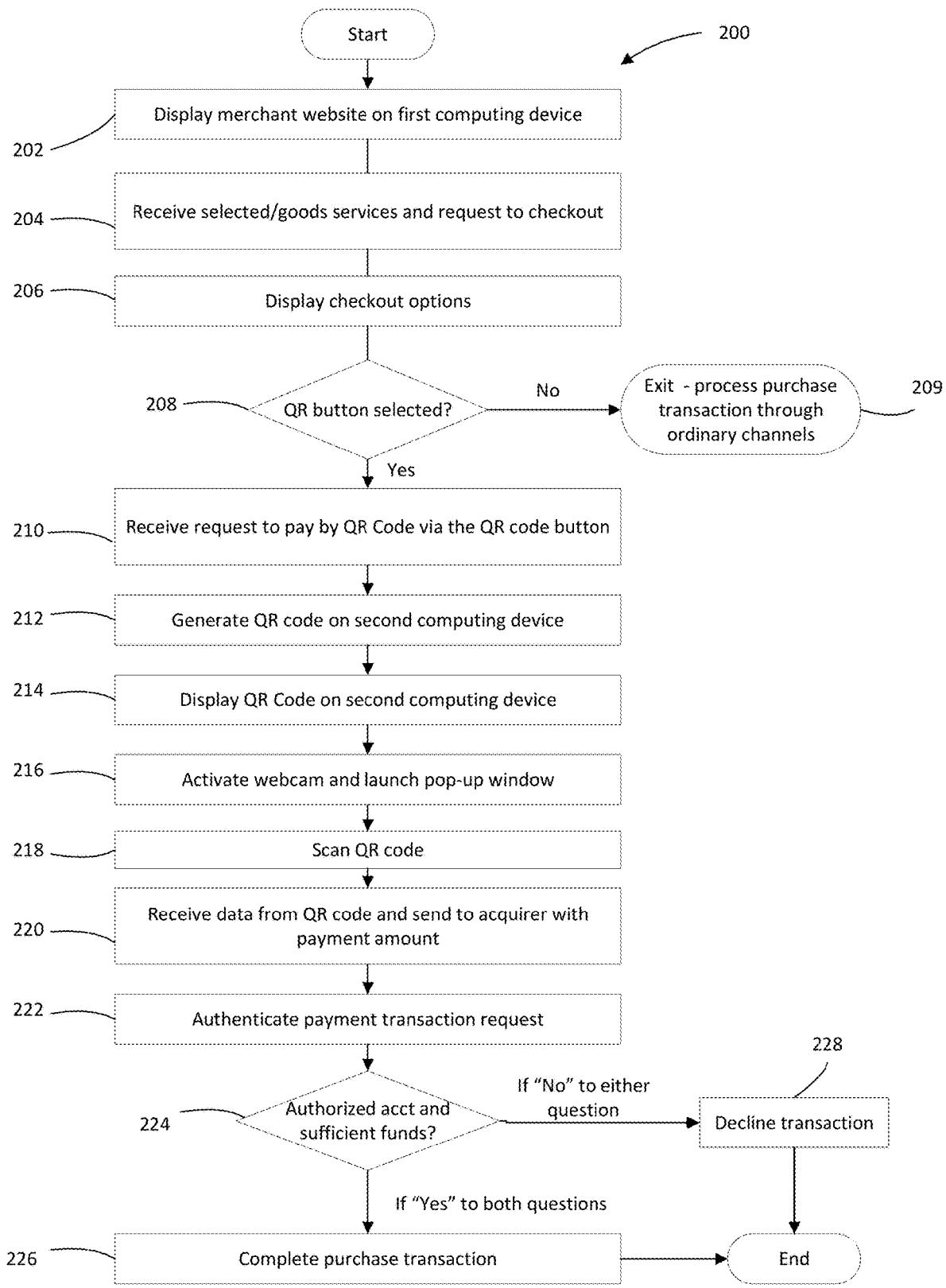
FIG. 2 is a flowchart of a method for facilitating an e-commerce purchase with a QR code.

FIG. 2 is a flowchart of a method 200 for facilitating an e-commerce payment transaction using a QR code. At a block 202, a website 108 of a merchant 110 is displayed on a first computing device 102. The website 108 may have an online shopping cart, which goods or services can be added to by a consumer 114. Once all the goods and/or services the consumer 114 wishes to purchased have been added to the online shopping cart, the consumer may send a request to checkout at a block 204.

In response to receiving the selected goods/services and the checkout request, the merchant at a block 206 may present various checkout options to the consumer 114 via the website 108 including traditional checkout options such as a payment window for the consumer to enter his or her name, shipping address, payment information including PAN, CVV, and billing address, a log-in page for a merchant account, where the consumer's payment information has already been entered (often referred to as a card-on-file transaction), and/or a log-in page for a third party payment account such as PayPal® or a digital wallet platform. In accordance with embodiments of the present disclosure, the merchant 110 my also provide a QR code button 116 that is displayed on the shopping cart window or on a separate window, which the consumer 114 may select at a block 208 by clicking on the QR code button 116 with a mouse 104 or by touch or other interaction with a display of the first computing device 102. If the consumer does not select the QR code button 116, then the method ends at a block 209 and the consumer may use the traditional checkout options.

If the user selects the QR code button 116 at block 208, the merchant 108 receives a request to pay by QR code at block 210. At a block 212, a QR code 130 having embedded data is generated by the second computing device 118 and then displayed on a display screen 140 of the second computing device at a block 214. In some embodiments, an application of the second computing device 118 may receive the QR code 130 or may generate the QR code 130 based on received signals. In other embodiments, a link may be communicated to the second computing device 118 to retrieve the QR code 130. Of course, other methods of creating the QR code 130 are possible and are contemplated.

At a block 216, a webcam 106 in communication with the first computing device 102 is activated and a pop-up window 138 is launched on the display 112 of the first computing device 102. The pop-up window 138 provides a visual aid as shown in FIG. 1A to the consumer 114 who uses the webcam to scan the QR code 130 on the second computing device 118 at a block 218. At a block 220, the embedded data 132 may be received by the merchant 110 and communicated to an acquirer along with the payment amount for the goods and/or services for authorization and payment as discussed above. At a block 222, the embedded data 132 may be communicated to the acquirer for authentication as discussed above. If the embedded data 132 is determined to be an authorized account and use and the payment amount is approved at a block 224, then the purchase transaction may be completed at a block 226. If either the embedded data 132 is not authorized or the amount is not approved, at a block 224, then the transaction may be declined at a block 228.

Figure 4:
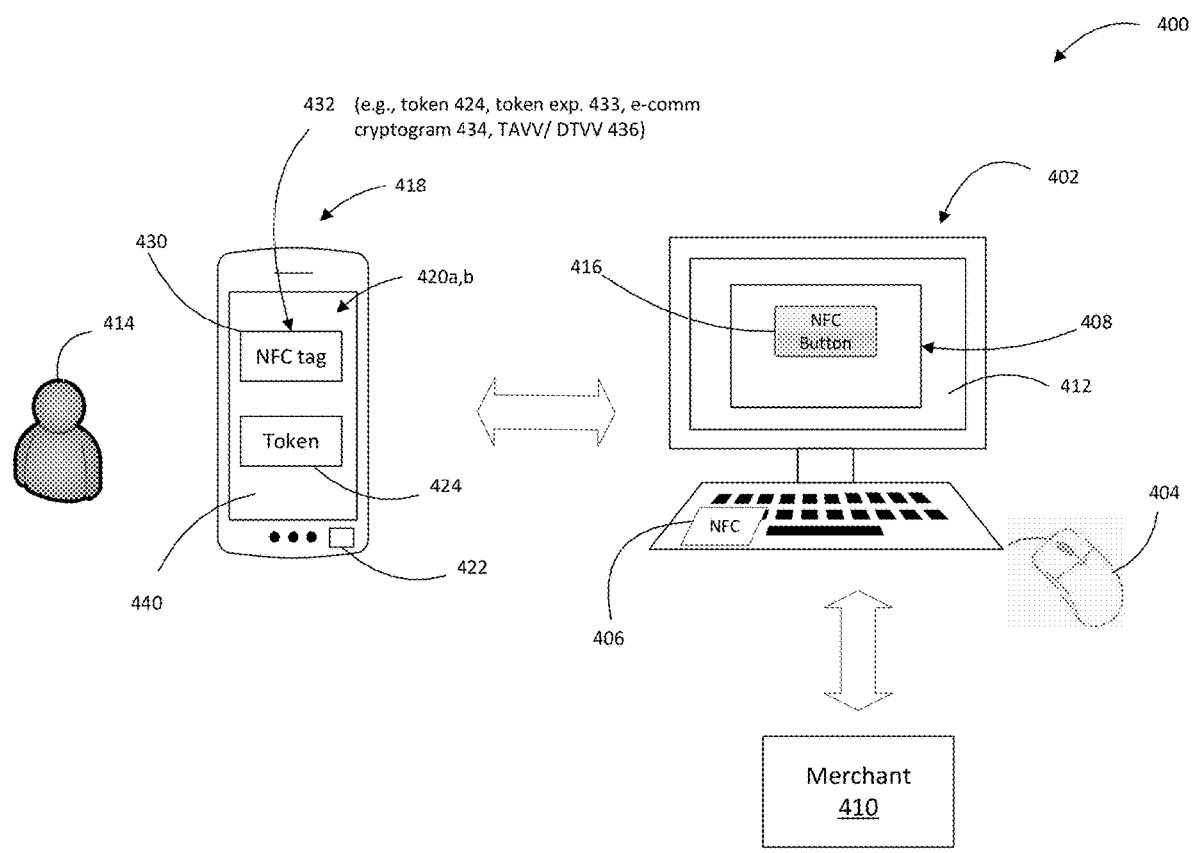
FIG. 4 illustrates a diagram of system components for an e-commerce payment transaction using NFC tags and readers in accordance with the present disclosure.

FIG. 4 generally illustrates an embodiment of a system 400 for an e-commerce payment transaction using NFC tags and readers. The system 400 may include a first computing device 402, which may be a laptop computer, desktop computer, tablet, mobile phone or the like. The first computing device 402 may have or be in communication with a mouse 404 or it may have a touch screen. The first computing device 402 may be NFC enabled in that it may have or be in communication with a NFC reader 406. The NFC reader 406 may be built into the first computing device or may be a separate device. The NFC reader 406 may be compliant with EMV standards.

The first computing device 402 may host a website 408 of a merchant 410 that is in communication with the first computing device 402. The first computing device 402 may display the website 408 on a display 412 of the first computing device 402. The website 408 may be used by a consumer 414 to purchase goods or services from the merchant 410. The website 408 may include a NFC button 416. When a consumer is finished selecting the items and/or services offered by the merchant 410 that the consumer 414 wishes to purchase and is ready to check out, the consumer 414 may select the NFC button 416 rather than proceeding with traditional checkout options such as logging into a merchant payment account where payment information is store, logging into a third party account or digital wallet account or by entering payment credentials into a payment window of the website 408. The NFC button 416 may be selected by clicking on the NFC button 416 with the mouse 404 or by a touch or other interaction with the display 412.

The system 400 may also include a second computing device 418 that may be in communication with the first computing device 402. The second computing device 418 may be a mobile phone, tablet, a laptop computer, or other mobile computing device. The second computing device 418 may have a payment app 420*a* or digital wallet platform 420*b* downloaded and saved in a memory 422 of the second computing device 418. The payment app 420*a* or the digital wallet platform 420*b* may be for example, Apple Pay™, Google Wallet™, Samsung Pay™, Walmart Pay™, among others.

The payment app 420*a* or the digital wallet platform 420*b* may have a token 424 that is stored in the memory 422. The token 424 may be a substitute identifier for the PAN 306 issued by the issuer 308 for a transaction card associated with a financial account 305 such as a credit card, debit card, gift card, e-gift card, loyalty card, brokerage account, retirement account, etc.

Figure 4A:
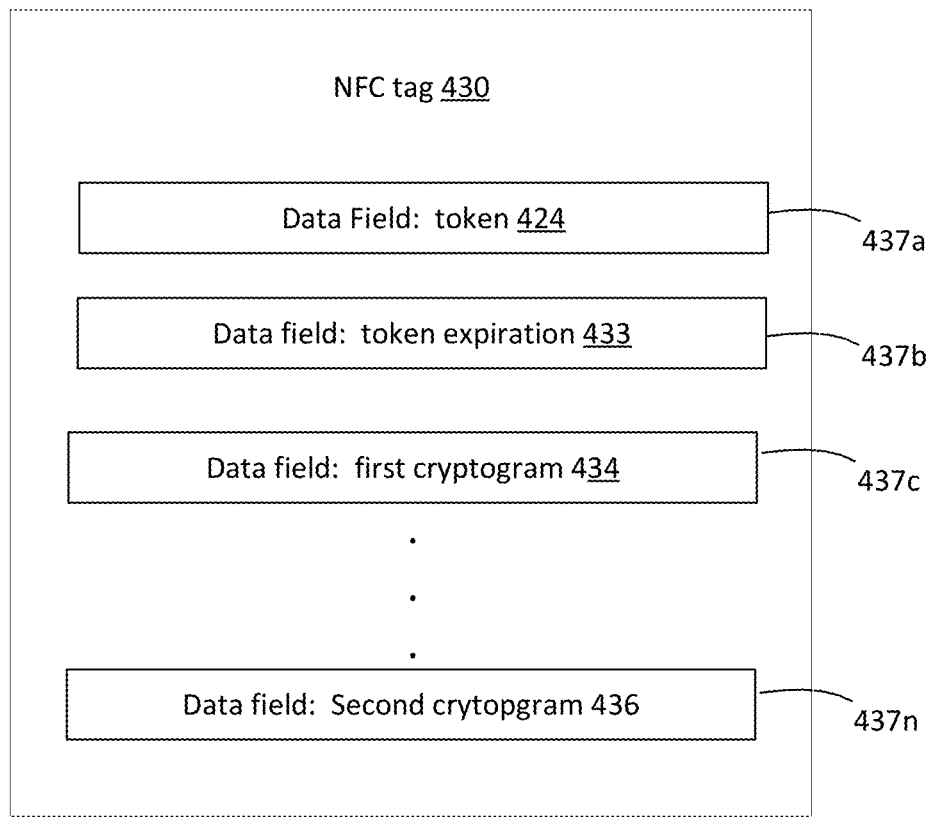
FIG. 4A is block diagram illustrating exemplary data fields contained in a NFC tag.

The payment app 420*a* or digital wallet platform 420*b* may be NFC enabled and capable of generating a NFC tag 430 in response to the consumer 414 selecting the NFC button 416 when the consumer 414 is ready to checkout. NFC tags are passive data stores that can be used to communicate with an active NFC device such as NFC reader 406 when in close range (i.e, less than 10 centimeters). NFC tags may communicate using the ISO/IEC 14443 type A and B wireless standards, which is the international standard for contact-less smartcards, may be compliant with EMV standards. The NFC tag 430 may include data 432 such as the token 424, an expiration date of the token 433, a first cryptogram 434, a second cryptogram 436, and other payment credentials such as a billing address. NFC tags may have a number of data fields 437a, b, c, . . . , n as shown in FIG. 4a which are used to store data. The data fields may be defined according to a protocol or standard which may be known and agreed upon to be used by the transaction network. Some of the data fields available with current NFC tags are not in use or are not widely used. For example, the IAD BFOC field is not currently in use.

The first and second cryptograms 434, 436 may be dynamic in that they change each time a NFC tag 430 is generated and may use EMV-based cryptography to secure the transaction. As with the first cryptogram 134, the first cryptograms 434 may be an ecommerce cryptogram. The first cryptogram 434 may be stored in various data fields currently used by NFC payment app technologies such as, e.g., Visa payWave® or MasterCard PayPass®. In some embodiments, the first cryptogram 434 may be stored in the "Issuer Application Data" (IAD) field such as field BFOC. In other embodiments, existing device bound NFC tags may be modified so that the first cryptogram 434 may be stored in the "Form Factor Indicator" field such as field 9F6E. In some embodiments, the first cryptogram 434 may also be stored in a field that is reserved for future use based on the current specifications for the various NFC payment app technologies. Similar to second cryptogram 136, the second cryptogram 436 may be a TAVV cryptogram or a DTVV cryptogram.

Upon selection of the NFC button 416, the consumer may be prompted via a pop-window or a flashing NFC button or by other means to touch or hover the second computing device 418 over the NFC reader 406. Through the reading process, the merchant 410 may obtain the data 432. Once the data 432 is obtained, it may be communicated to the acquirer 314 for authentication along with the transaction payment amount for approval and processing.

Figure 5:
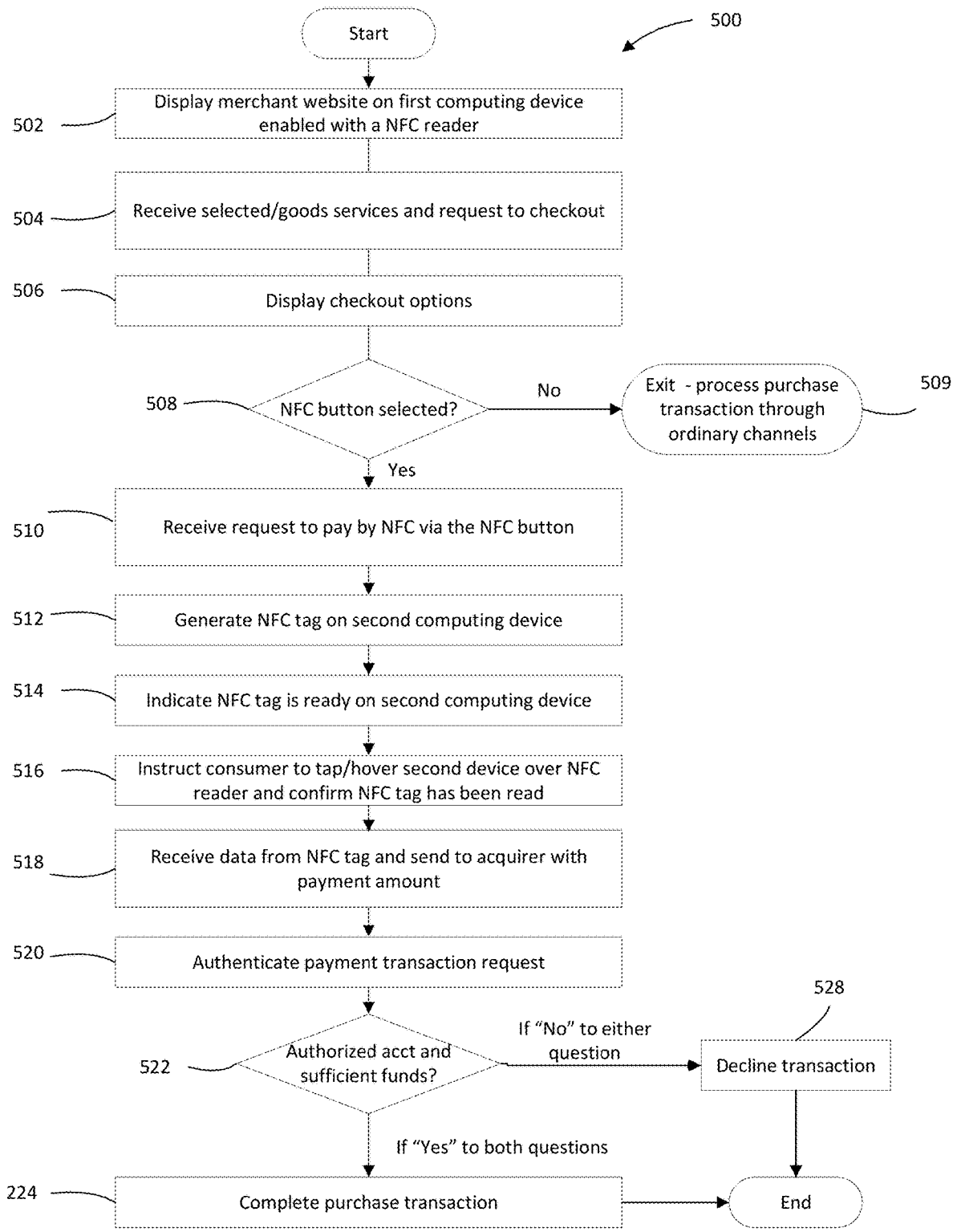
FIG. 5 is a flowchart of a method for facilitating an e-commerce purchase with NFC tags and readers.

FIG. 5 is a flowchart of a method 500 for facilitating an e-commerce payment transaction using NFC technology. At a block 502, a website 408 of a merchant 410 may be displayed on a first computing device 402 having or being in communication with a NFC reader 406. The merchant website 408 may have an online shopping cart, which goods or services can be added to by a consumer. Once all the goods and/or services the consumer 414 wishes to purchase have been added to the online shopping cart, the consumer 414 may send a request to checkout at a block 504.

In response to receiving the goods/services and the checkout request, the merchant 410 at a block 506 may display various checkout options to the consumer 414 including traditional checkout options such as providing a payment window for the consumer 414 to enter his or her name, shipping address, payment information including a PAN, CVV, and billing address, providing the consumer with the option of logging into a merchant account, and/or providing the option of logging into a third party payment account such as PayPal® or a digital wallet platform. In accordance with embodiments of the present disclosure, the merchant 410 may also provide a NFC button 416 that is displayed on the shopping cart window or on a separate window, which the consumer 414, at a block 508, may select the NFC button 416 by clicking on it with a mouse 404 or by touch or other interaction with a display of the first computing device 402.

If the consumer does not select the NFC button 416, then the method ends at a block 509 and the consumer may use the traditional checkout options.

If the user selects the NFC button at block 508, the merchant 410 receives a request to pay by NFC at block 510. At a block 512, a NFC tag 430 having data 432 is generated by the second computing device 418. In some embodiments, the data 432 generated is only an ecommerce cryptogram (e.g., a first cryptogram 434) rather than a full cryptogram (e.g., first and second cryptograms 434, 436). An indication that the NFC tag 430 is ready to be read is displayed on a display 440 of the second computing device 418 at a block 514. In some embodiments, an application of the second computing device 418 may receive the NFC tag 430 or may generate the NFC tag 430 based on received signals. In other embodiments, a link may be communicated to the second computing device 418 to retrieve the NFC tag 430. Of course, other methods of creating the NFC tag 430 are possible and are contemplated.

At a block 516, a pop-up window may be launched on the display of the first computing device 402. The pop-up window may instruct the consumer to tap or hover the second computing device 418 over the NFC reader 406 on the first computing device 402 and then confirm that the NFC tag 430 has been read. At a block 518, the data from the NFC tag 430 may be received by the merchant and communicated to an acquirer along with the payment amount for the goods and/or services for authorization and payment completion. At a block 520, the data may be communicated to the acquirer for authentication as discussed above. If the data is determined to be an authorized account and use and the payment amount is approved at a block 522, then the purchase transaction may be completed at a block 524. If either the data is not authorized or the amount is not approved, at a block 524, then the transaction may be declined at a block 528.

The ability to address the technical problem of providing a more secure and efficient online checkout process in the form of QR code and NFC checkout options on a merchant website may be just one of many a practical application of these technologies which benefits consumers, merchants, and issuers. Merchants and issuers benefit as they are less at risk of a consumer's PAN and other identifying information from being comprised by data breaches when a consumer is shopping online. Merchants also benefit by providing checkout options to consumers that are similar to current in-store checkout options, making online shopping similar to the in-store experience. Consumers benefit from not only having more secure online transactions, but also benefit from the ease and efficiency of using QR code and NFC technologies when shopping online.

The first and second computing devices 102, 118 may be able to communicate with each and the various components of the systems and devices described in FIGS. 1, 3, 4, 6, and 7 via a communication network such as cellular service, through the Internet, a private network, etc., having a variety of communication channels. In some embodiments, the communication channels may be wired such as through an Ethernet cable, a USB cable or RJ6 cable. In other embodiments, the communication channels may be wireless such as through Wi-Fi (802.11 standard), Bluetooth, cellular communication or near field communication (NFC) devices. The communication between the first and second computing devices 102, 118 and the other components of the systems and devices 100, 300, 400, 600, and 700 may be direct or through a wireless network, e.g., Bluetooth, etc.

Figure 6:
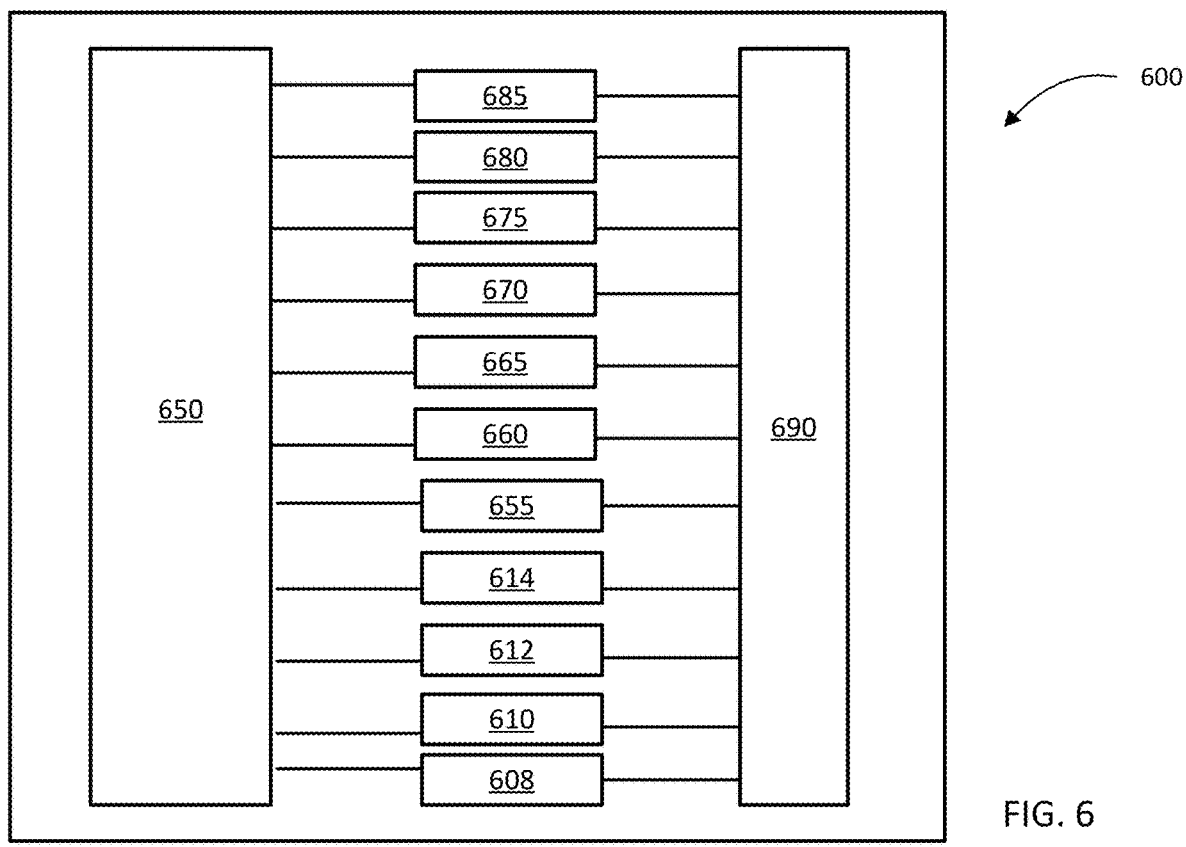
FIG. 6 is block diagram of system components of a first computing device in accordance with the present disclosure.

FIG. 6 may be an example computing device 600, such as first computing devices 102 and 402, that may be physically configured to interact with another computing device such as second computing devices 118, 418, and various components of systems 100, 300, and 400. The computing device 600 may have a processor 650 that is physically configured according to computer executable instructions. The computing device 600 may have a portable power supply 655 such as a battery which may be rechargeable. It may also have a sound and video module 660 which assists in displaying video and sound and may turn off when not in use to conserve power and battery life. The computing device 600 may also have volatile memory 665 and non-volatile memory 670 as well as internal storage 675 or external storage 680. The computing device 600 may have GPS capabilities 685 that may be a separate circuit or may be part of the processor 650. There also may be an input/output bus 690 that shuttles data to and from the various user input devices such as a camera 608 such as webcam 106, a mouse 610 such as mouse 104, 404, a NFC reader 612 such as NFC reader 406, and other inputs 614, etc. It also may control communicating with other computing devices and system components, either through wireless or wired devices. Of course, this is just one embodiment of the computing device 600 and the number and types of computing devices 600 is limited only by the imagination.

Figure 7:
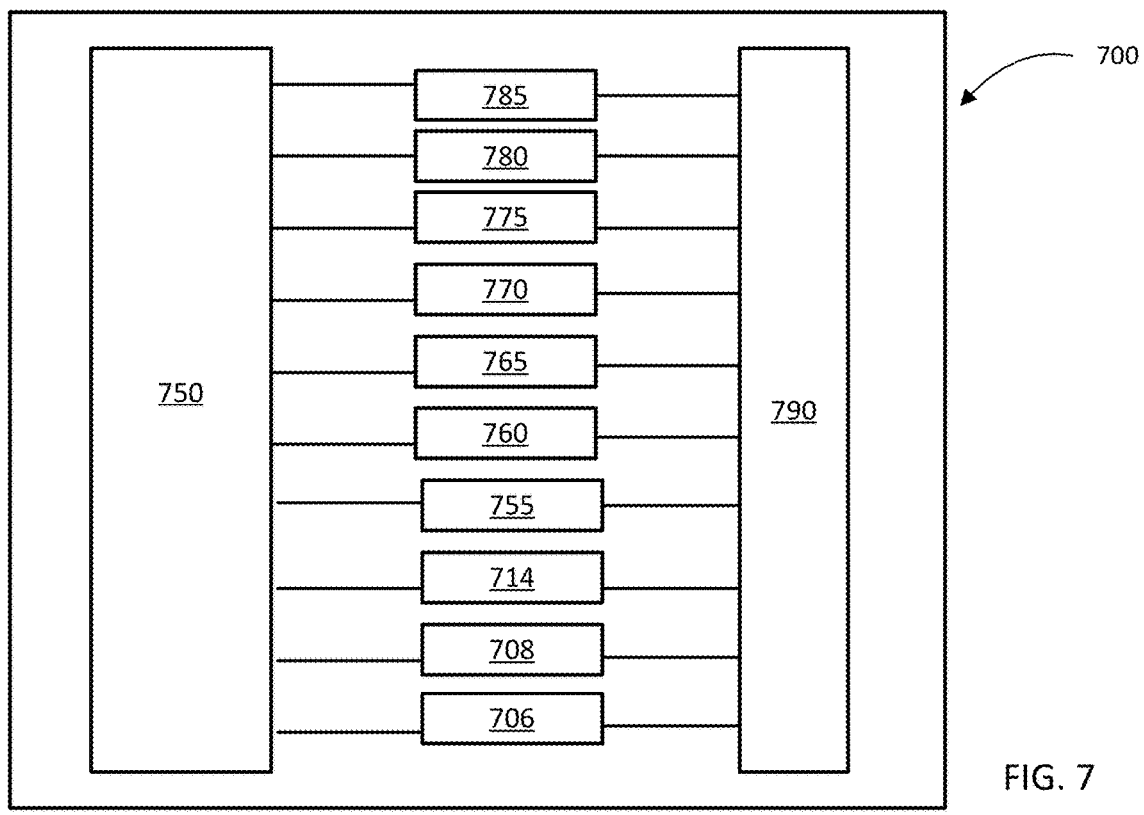
FIG. 7 is a block diagram of system components of a second computing device in accordance with the present disclosure.

FIG. 7 may be another example computing device 700, such as second computing devices 118 and 418, that may be physically configured to interact with another computing device such as first computing devices 102, 402, and various components of systems 100, 300, and 400. The computing device 700 may have a processor 750 that is physically configured according to computer executable instructions. The computing device 700 may have a portable power supply 755 such as a battery which may be rechargeable. It may also have a sound and video module 760 which assists in displaying video and sound and may turn off when not in use to conserve power and battery life. The computing device 700 may also have volatile memory 765 and non-volatile memory 770, such as memory 122 and 422, as well as internal storage 775 or external storage 780. The computing device 700 may have GPS capabilities 785 that may be a separate circuit or may be part of the processor 750. There also may be an input/output bus 790 that shuttles data to and from the various user input devices such as a microphone 706, a camera 708, and other inputs 714, etc. It also may control communicating with other computing devices and system components, either through wireless or wired devices. Of course, this is just one embodiment of the computing device 700 and the number and types of computing devices 600 is limited only by the imagination.

The merchant computing system may also have a processor, a memory and an input output circuit. The processor may be physically configured according to instructions to enable the communication, generation and interpretation of the data that represents the QR code or the NFC code. The instructions to physically configure the processor to communicate, generate and interpret the data that represents the QR code or the NFC code may be custom written, may be from a "white label" source or may be a combination of both.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The computing devices, computers, and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user computing devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The computing devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for facilitating e-commerce payment comprising:
a processor physically configured for executing computer-executable instructions to:
display a merchant website on a display of a first computing device, wherein the merchant website includes a quick response (QR) code button to initiate a payment transaction;
receive a request to pay by a QR code via activation of the QR code button;
in response to receiving a request to pay via the QR code button on the merchant website,
generate for display on a second computing device the QR code, wherein the QR code has embedded data and is associated with a tokenized primary account number for a financial account of a user that is stored in a memory of the second computing device, and wherein the embedded data includes a first cryptogram and a second cryptogram;
activate a webcam in communication with the first computing device, wherein the webcam is used to scan the QR code displayed on the second computing device;
launch a pop-up window on the display of the first computing device;
receive, via the webcam of the first computing device, an image of the second computing device displaying the QR code;
display the image of the second computing device displaying the QR code within the pop-up window of the first computing device;
provide an indication on the first computing device that the QR code has been successfully scanned;
receive the embedded data from the QR code;
in response to receiving the embedded data, complete the payment transaction using the financial account of the user.

2. The system of claim 1, wherein the first cryptogram is a dynamic e-commerce cryptogram.

3. The system of claim 2, further comprising computer executable instructions to:
authenticate the payment transaction via the dynamic e-commerce cryptogram.

4. The system of claim 1, wherein the second cryptogram is a Transaction Authentication Verification Value (TAVV) cryptogram or a Dynamic Token Transaction Verification Value (DTVV) cryptogram.

5. The system of claim 1, wherein the embedded data includes payment credentials of the user.

6. The system of claim 5, wherein the payment credentials include a token for a primary account number and a token expiration date.

7. The system of claim 1, wherein the primary account number is for a credit card, debit card, or e-gift card.

8. The system of claim 1, wherein the primary account number is tokenized using an app or a wallet account on the second computing device.

9. The system of claim 1, further comprising computer executable instructions to:
display a pop-up window on the first computing device to facilitate scanning of the QR code by the webcam.

10. The system of claim 1, wherein the first computing device is a laptop computer, desktop computer, tablet, or mobile phone.

11. A non-transitory computer readable medium stored thereon computer-executable instructions embodied in a software product executed by a processor, wherein the computer-executable instructions comprising:
- displaying a merchant website on a display of a first computing device, wherein the merchant website includes a quick response (QR) code button to initiate a payment transaction;
- receiving a request to pay by a QR code via activation of the QR code button;
- in response to receiving a request to pay via the QR code button on the merchant website,
- generating, via the processor, for display on a second computing device the QR code, wherein the QR code has embedded data and is associated with a tokenized primary account number for a financial account of a user that is stored in a memory of the second computing device, and wherein the embedded data includes a first cryptogram and a second cryptogram;
- activating a webcam in communication with the first computing device, wherein the webcam is used to scan the QR code displayed on the second computing device;
- launching a pop-up window on the display of the first computing device;
- receiving, via the webcam of the first computing device, an image of the second computing device displaying the QR code;
- displaying the image of the second computing device displaying the QR code within the pop-up window of the first computing device;
- providing an indication on the first computing device that the QR code has been successfully scanned;
- receiving the embedded data from the QR code;
- in response to receiving the embedded data, complete the payment transaction using the financial account of the user.

12. The non-transitory computer readable medium of claim 11, wherein the first cryptogram is a dynamic e-commerce cryptogram.

13. The non-transitory computer readable medium of claim 12, further comprising:
- authenticating the payment transaction via the dynamic e-commerce cryptogram.

14. The non-transitory computer readable medium of claim 11, wherein the second cryptogram is a Transaction Authentication Verification Value (TAVV) cryptogram or a Dynamic Token Transaction Verification Value (DTVV) cryptogram.

15. The non-transitory computer readable medium of claim 11, wherein the embedded data includes payment credentials of the user.

16. The non-transitory computer readable medium of claim 15, wherein the payment credentials include a token for a primary account number and a token expiration date.

17. The non-transitory computer readable medium of claim 11, wherein the primary account number is for a credit card, debit card, or e-gift card.

18. The non-transitory computer readable medium of claim 11, wherein the primary account number is tokenized using an app or a wallet account on the second computing device.

19. The non-transitory computer readable medium of claim 11, further comprising:
- displaying a pop-up window on the first computing device to facilitate scanning of the QR code by the webcam.

20. The non-transitory computer readable medium of claim 11, wherein the first computing device is a laptop computer, desktop computer, tablet, or mobile phone.

* * * * *